United States Patent [19]
Onoda

[11] Patent Number: 4,582,336
[45] Date of Patent: Apr. 15, 1986

[54] CENTER STAND FOR MOTORCYCLE

[75] Inventor: Kunishige Onoda, Kobe, Japan

[73] Assignee: Kawasaki Jukogyo Kabushiki Kaisha, Kobe, Japan

[21] Appl. No.: 576,122

[22] Filed: Feb. 2, 1984

[30] Foreign Application Priority Data

Feb. 4, 1983 [JP] Japan .................. 58-17872

[51] Int. Cl.⁴ .............................................. B62H 1/02
[52] U.S. Cl. .................................................... 280/293
[58] Field of Search ............... 280/293, 298, 299, 300; 180/219

[56] References Cited

U.S. PATENT DOCUMENTS 4,358,127 11/1982 Kissick .................. 280/293 X
4,494,764  1/1985 Kelley ................... 280/293

FOREIGN PATENT DOCUMENTS 454217  1/1950 Italy ..................... 280/293
183362  3/1936 Switzerland ........... 280/293
134796 11/1919 United Kingdom ... 280/299

*Primary Examiner*—John A. Pekar
*Attorney, Agent, or Firm*—Marshall, O'Toole, Gerstein, Murray & Bicknell

[57] ABSTRACT

This disclosure relates to a center stand for a motorcycle having a frame. The stand includes a support that is secured to and projects from the lower center part of the frame, supporting plates rotatably attached by first pivots to said support, second pivots on the supporting plates, and a main leg that is pivotably connected with said second pivots. In operation the center stand is erected by rotating the main leg around the second pivot to a generally vertical position and then rotating the supporting plates first around the first pivot until the main leg reaches the ground and then around the second pivot to lift the motorcycle onto the main leg.

4 Claims, 8 Drawing Figures

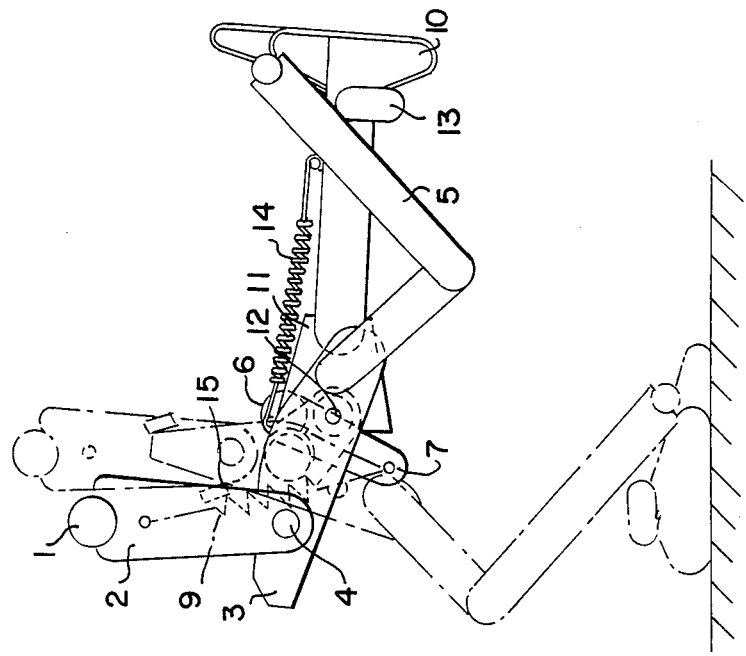
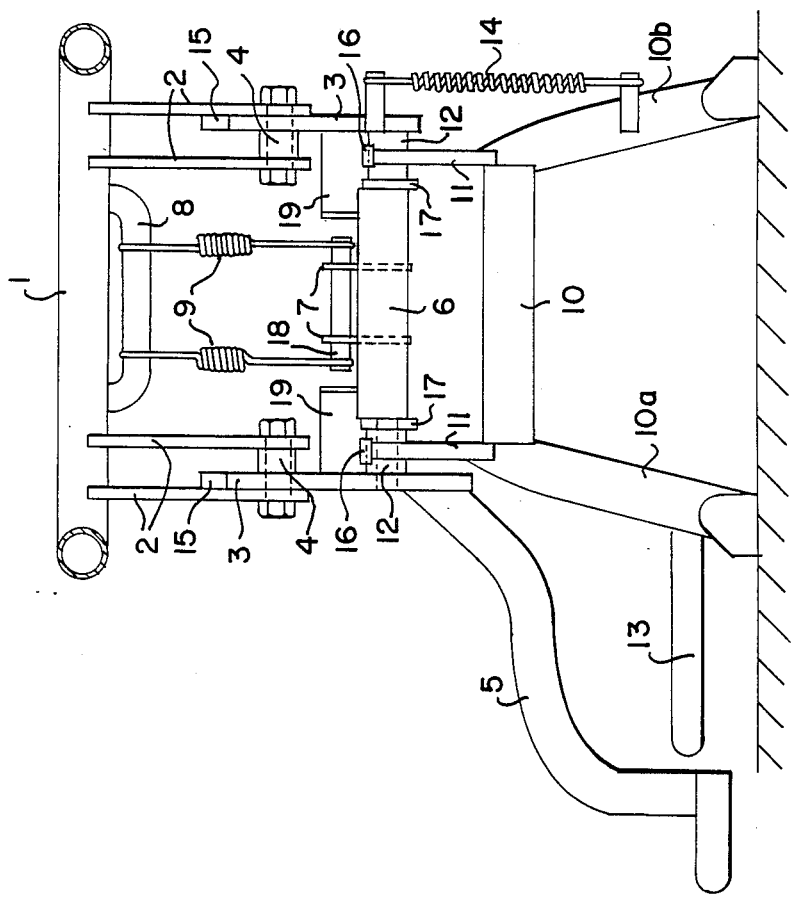

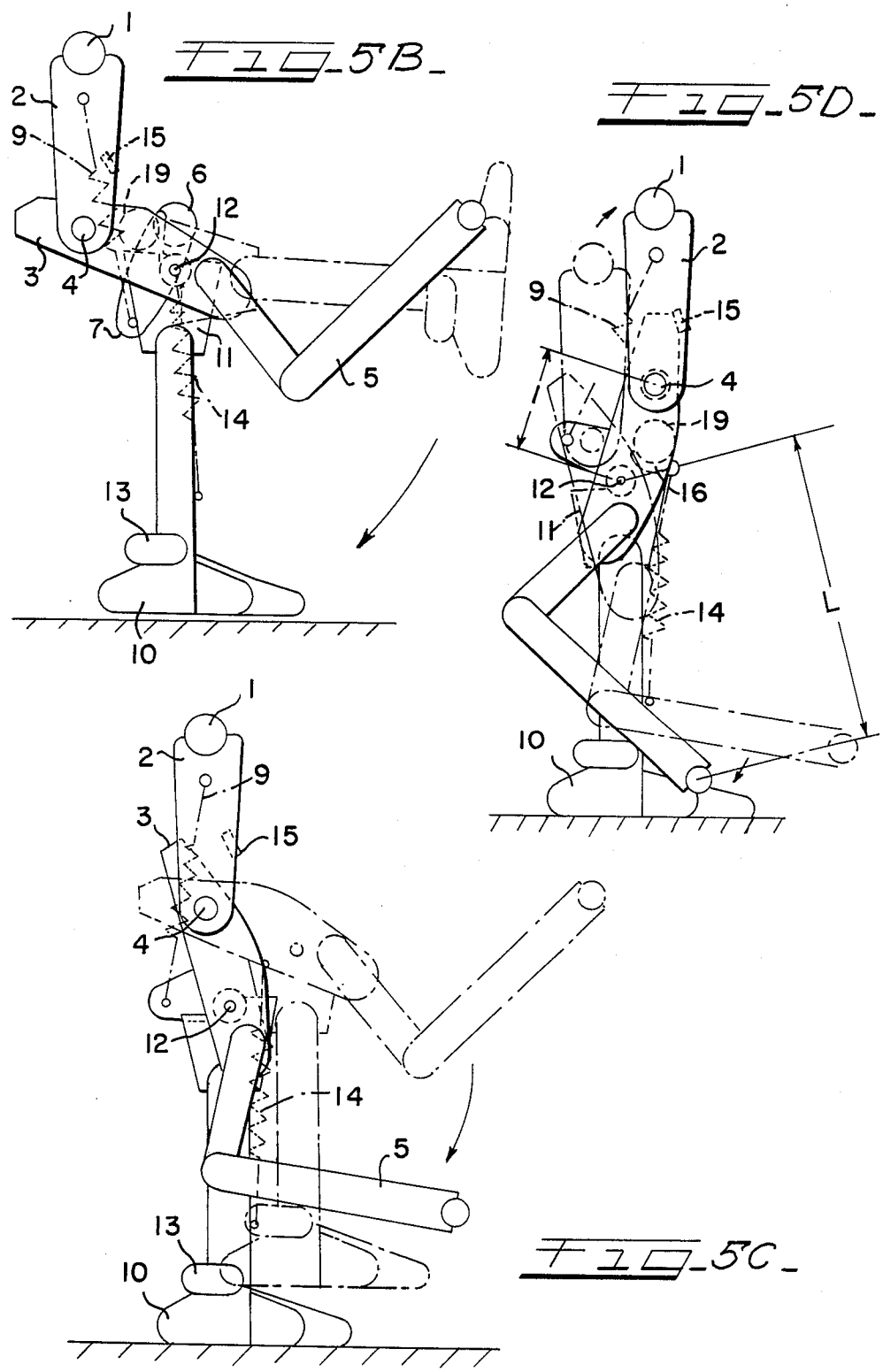

CENTER STAND FOR MOTORCYCLE

This invention relates to a center stand for supporting a motorcycle in its upright position.

BACKGROUND OF THE INVENTION

A conventional center stand, shown in FIGS. 1 and 2, comprises a main leg portion 10' having a trapezoidal shape when viewed from the rear of the motorcycle. The upper end of the leg portion is pivotably fixed to the lower frame 1 of the motorcycle in the approximate center of the motorcycle (not completely shown), so that the leg portion may pivot about 90 degrees between its perpendicular and horizontal positions. The main leg portion 10' is always urged or biased toward the horizontal position by a tension spring 14' connected between the leg portion and the frame 1. An operating lever 13' is fastened to one part 10a' of the leg portion in such a manner that it protrudes outwardly and rearwardly to facilitate erection of the stand by an operator.

In order to erect a center stand having the above construction, the main leg portion 10' must be rotated clockwise as seen in FIG. 1 from its horizontal position (not shown) against the force of the spring 14' until the lower end or foot of the main leg portion 10' reaches the ground. Then, the main leg portion 10' must be further rotated clockwise by engaging the operating lever 13' while lifting the motorcycle upwardly and rearwardly with the ground contact point as a fulcrum. In order to convert the stand from its erected position (FIG. 1) (for parking) to its horizontal position (for driving), the main leg portion 10' must be rotated counterclockwise (see dash-dot lines in FIG. 1) around the ground contact point at the lower end of the main leg portion 10' while pushing the motorcycle forwardly until the main leg portion 10' resumes its horizontal position with the aid of the spring 14'.

As will be obvious from the above discussion, it has been necessary to apply to the operating means 13' a force corresponding to the approximate total weight of the motorcycle when operating a conventional motorcycle stand. With a heavy motorcycle having a large displacement engine, therefore, such an operation has been an extreme burden to the rider.

To eliminate this inconvenience, it has been proposed, as described in Japanese Patent Provisional Pub. No. SHO 48-77548, to operate a stand by means of a hydraulic drive mechanism. Utilizing a hydraulic system provided on a motorcycle has, however, been found disadvantageous because it involves a complex construction, resulting in increased assembly processes and considerably higher cost.

BRIEF SUMMARY OF THE INVENTION

To overcome the above-mentioned problems, a center stand in accordance with the present invention comprises supporting members fixed to the frame, operating members rotatably mounted on said supporting members and a main leg rotatable with respect to said operating members, which can be operated smoothly and easily with a substantial reduction in operating force realized by a two-step operation of these three constituent members.

BRIEF DESCRIPTION OF THE DRAWINGS

The invention may be better understood from the following description of a specific example of this invention with reference to the accompanying drawings, wherein:

FIG. 4 a rear view of the stand shown in FIG. 3; and

FIGS. 5A through 5D illustrate the stand in a sequence of positions from its horizontal position to its vertical erected position.

DETAILED DESCRIPTION OF THE DRAWINGS

Figure 1:
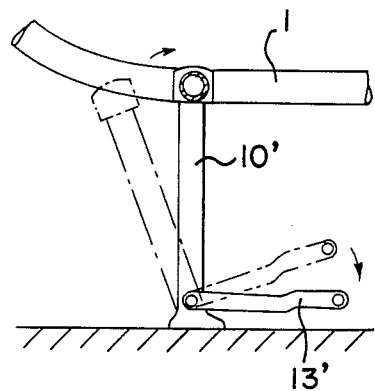
FIG. 1 is a side view showing a typical center stand having a conventional construction.
Figure 2:
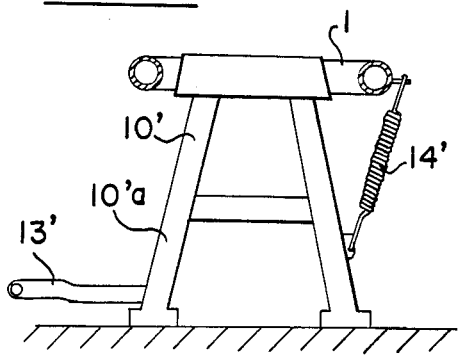
FIG. 2 is a rear view of the center stand in FIG. 1.
Figure 3:
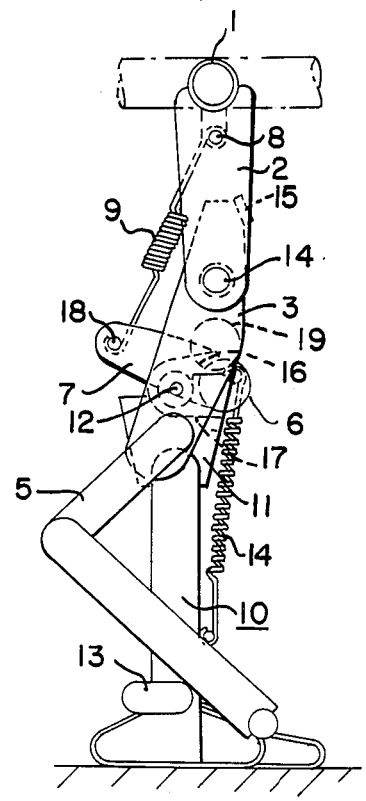
FIG. 3 is a side view of a stand in accordance with this invention in its erected position.

Referring first to FIGS. 3 and 4, the numeral 1 indicates the lower center frame of a motorcycle and numeral 2 indicates a pair of supporting members which are secured to and project downwardly from the end portions of the frame 1, each of said supporting members consisting of two plate-like components. Numeral 3 denotes a pair of triangularly shaped, as seen from the left side of the motorcycle, supporting plates, the upper part of each of the supporting plates 3 being rotatably supported by means of a first pivot 4 between the lower ends of the two components of one of the supporting members 2. This pivot connection 4 is formed by a short tube that rotatably fits on a bolt which is connected between the components of the support members 2. The numeral 5 denotes an operating rod having an angular shape as seen from the left side of the motorcycle (see FIG. 3). The upper end of the operating rod 5 is secured to the lower end of the left supporting plate 3 so that the rod 5 is rotatable around the pivot 4 together with the attached supporting plate 3. The other end of the operating rod protrudes laterally and downwardly with respect to the motorcycle. The numeral 6 denotes a horizontal tube or pipe linked by coupling members 17 to second pivot pins 12 (FIG. 3) which are secured to the lower portions of the supporting plates 3. The pipe 6 is eccentrically located with respect to the second pivots 12 such that the pipe 6 is positioned toward the rear of the motorcycle. At the center of the pipe 6 are mounted a pair of brackets 7 which project toward the front of the motorcycle when the stand is in the erected position (as shown in FIG. 3). A latching rod 8, which extends parallel with the pipe 6, is secured to the lower side of the frame 1, and first tension springs 9 (FIG. 4) are mounted by pins 18 between said latching rod 8 and the ends of said brackets 7.

The numeral 10 denotes a main leg having a trapezoidal shape as seen from the rear of the motorcycle. Supporting pieces 11 of inverted trapezoidal shape extend from the respective ends of the horizontal upper side of the main leg 10, the upper end portions of the supporting pieces 11 being in contact with the respective second pivots 12 over approximately half their area. The upper edge of each of the supporting pieces 11 slides on the periphery of the adjacent pivot 12 and rotates therearound. The supporting pieces 11 have projections which extend upwardly behind the pivots 12 and have semicircular engaging members 16 (FIGS. 3 and 4) which are fixed to the upper ends of the extensions.

The main leg 10 includes two spaced legs 10a and 10b, and an operating lever 13 is mounted on the lower end portion of the left leg 10a of the main leg 10 so as to protrude outwardly adjacent the rod 5. A second tension spring 14 is installed between the lower part of the right leg 10b (FIG. 4) and the lower part of the right supporting plate 3.

The numeral 15 denotes stops to limit the rotation of said supporting plates 3 relative to the supporting members 2. Each of the stops 15 is secured to the inner surface of one of the supporting members 2 at the position where the stop engages the supporting plate 3 when in its approximately vertical position, and the stops thus impede the rotation of the plates 3 in their erected position.

At substantially the center of each supporting plate 3 is secured a stop 19, and the engaging member 16 of each supporting piece 11 moves into contact with the adjacent stop 19 when the main leg 10 is in the vertical position (as shown in FIG. 3), thereby limiting the rotation of the main leg 10 in relation to the second pivots 12.

The operation of the specific example of the mechanism is now discussed with reference to FIGS. 5A through 5D which illustrate the sequence of positions of the stand from its horizontal position to its erected position.

Referring to FIG. 5A, the solid lines show the stand in its horizontal or retracted position, whereas dot-dash lines show the vertical or erected position. As shown, the entire stand, including the operating rod 5 and the main leg 10 are respectively urged by the first springs 9 and by the second spring 14 to the retracted (horizontal) positions while the motorcycle is operated. The first step taken to erect the stand in order to park the motorcycle is to rotate the main leg 10 clockwise, using the operating part 13, about 90 degrees against the force of the second spring 14. Then, the main leg 10 rotates around the second pivots 12 as the second spring 14 passes the pivots 12 until the supporting pieces 11 come into contact with the stop 19, whereby the main leg 10 is prevented from rotation around the second pivots 12 and is held in its vertical position by the second spring 14. At this stage, the lower ends of the main leg 10 are still slightly raised above ground level (see FIG. 5B).

The second step is to rotate the operating rod 5 clockwise against the springs 9. This causes the supporting plates 3 to rotate around the first pivots 4 with the position of the second pivots 12 simultaneously rotating around the first pivots 4. Thus, as shown in FIG. 5C, the main leg 10 reaches the ground when the supporting plates 3 have rotated through a short angle.

Then, the operating rod 5 is further rotated clockwise until the supporting plates 3 engage with stop 15. Since the main leg 10 is held in a fixed position by engagement with the ground at this point, the supporting plates 3 now rotate around the second pivots 12, whereby the motorcycle is lifted, together with the frame 1, by the clockwise rotation around the second pivots 12 imposing its weight on the main leg 10. Under this condition, the supporting plates 3, energized by the first springs 9 to rotate clockwise, are held in the vertical position due to the engagement of members 16 of the supporting pieces 11 with the stop 19, as illustrated in FIG. 5D.

The second pivots 12 operate as fulcrums and the first pivots 4 as points of action. Therefore, designating the distance from the force input point to the fulcrum as L, the distance from the fulcrum to the point of action as 1, the load at the point of action as W, and the force applied to the force input point as F., as shown in FIG. 5D, one obtains the equation $1 \cdot W = L \cdot F$. Solving this equation for F produces $F = 1 \cdot W/L$. This means that the smaller the value of 1/L (lever ratio), the less the operating force required. Thus, the process of erecting the stand is completed.

To set the stand back to the horizontal position for driving the motorcycle, the motorcycle only need be pushed forwardly while rotating the entire stand in the counterclockwise direction around the first pivots 4. Then, the entire stand is returned to the horizontal position by the force of the second spring 14, the main leg thereby being in its horizontal position.

As described above, the present invention provides a center stand in which supporting plates 3 secured with the operating rod 5 are pivotally supported at their end portions by supporting members 2 projecting downward from the lower center frame 1 of the motorcycle, so that the plates 3 are rotatable between their horizontal (FIG. 5A) and vertical (FIG. 5D) positions. The main leg 10 is pivotally supported at its upper sides by said supporting plates 3 at points spaced toward the opposite ends from the connection with said supporting members, so that the main leg is rotatable between its horizontal and vertical positions. The springs 9 are mounted between said supporting plates and said frame or supporting members so as to hold the supporting plates 3 in their horizontal or vertical position. Another spring 14 is mounted between the supporting plate 3 and the main leg 10 so as to hold the main leg in its horizontal or vertical position, whereby the center stand can be erected by rotating and holding the main leg in its vertical position, and pressing the operating rod to move the main leg to the ground and then to rotate the supporting plates 3 around the pivots connected to the main leg 10 so that the motorcycle is lifted to impose its load on the main leg. This construction, which makes effective use of the lever principle, permits stand operation using very little force, corresponding to only a fraction of the weight of the motorcycle.

In addition, a stand according to this invention promises smooth, accurate and safe operation. It is particularly advantageous when used with a heavy motorcycle having a large displacement engine. Additionally, the fact that there is an auxiliary drive mechanism, such as that employed in the prior art, permits simpler construction and accordingly lower cost.

What is claimed is:

1. A center stand for a motorcycle, comprising a pair of supporting members adapted to be secured to and project from the lower center frame of the motorcycle, supporting plates rotatably attached by first pivots to said supporting members and rotatable on said first pivots between a generally horizontal position and a generally vertical position, second pivot means linking said supporting plates with each other at their lower ends, first springs connecting said supporting plates with said frame, a main leg movably connected with said second pivots and rotatable on said second pivots between a generally horizontal position and a generally vertical position, a second spring connected between said main leg and said supporting plates, whereby the center stand is operated to erected position by rotating said main leg around said second pivot to a substantially vertical position while said supporting plates are in said generally horizontal position, and rotating said supporting plates from said generally horizontal position to said generally vertical position at first around the first pivot unitl said main leg reaches the ground and then around the second pivot to lift the motorcycle onto the main leg.

2. A center stand for a motorcycle having a frame, comprising support means adapted to be secured to and project from the lower center part of the frame, supporting plates rotatably attached by first pivots to said support means and rotatable between generally horizontal and vertical positions, second pivots on said supporting plates, and a main leg pivotably connected with said second pivots and rotatable between generally horizontal and vertical positions, whereby the center stand is erected by rotating said main leg around said second pivot to said generally vertical position while said supporting plates are in said generally vertical position and then rotating the supporting plates from said generally horizontal position to said generally vertical position first around the first pivot until said main leg reaches the ground and then around the second pivot to lift the motorcycle onto the main leg.

3. A center stand according to claim 2, and further including first spring means connecting said supporting plates with the frames, and second spring means connecting said main leg with said supporting plates.

4. A center stand according to claim 2, and further including a first actuating arm connected to said supporting plates, and a second actuating arm connected to said main leg.

* * * * *